United States Patent
Woo et al.

(10) Patent No.: US 11,667,182 B2
(45) Date of Patent: Jun. 6, 2023

(54) CHASSIS PLATFORM MODULE FOR ELECTRIC VEHICLE

(71) Applicant: HYUNDAI MOBIS CO., LTD., Seoul (KR)

(72) Inventors: Hyung Jin Woo, Yongin-si (KR); Hyoun Young Oh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 125 days.

(21) Appl. No.: 17/368,226

(22) Filed: Jul. 6, 2021

(65) Prior Publication Data

US 2022/0009330 A1   Jan. 13, 2022

(30) Foreign Application Priority Data

Jul. 7, 2020   (KR) ........................ 10-2020-0083304

(51) Int. Cl.
*B60K 1/04*   (2019.01)
*B60L 50/60*   (2019.01)
(Continued)

(52) U.S. Cl.
CPC ................ *B60K 1/04* (2013.01); *B60L 50/66* (2019.02); *B62D 25/2018* (2013.01); *B62D 27/023* (2013.01); *B60K 2001/0438* (2013.01)

(58) Field of Classification Search
CPC ... B60K 1/04; B60K 2001/0438; B60L 50/66; B62D 25/2018; B62D 27/023; B62D 27/026; Y02T 10/70
See application file for complete search history.

(56) References Cited

U.S. PATENT DOCUMENTS 2,964,331 A * 12/1960 Sherman ................ B62D 21/07
                                                                  280/792
4,422,685 A * 12/1983 Bonfilio ................. B62D 65/04
                                                                  296/193.04
(Continued)

FOREIGN PATENT DOCUMENTS

JP          2018-65490 A      4/2018
KR   10-2020-0009685 A       1/2020

OTHER PUBLICATIONS

Extended European Search Report issued in corresponding European Patent Application No. 21183910.5 dated Dec. 6, 2021.

*Primary Examiner* — James M Dolak
*Assistant Examiner* — James J Triggs
(74) *Attorney, Agent, or Firm* — Morgan, Lewis & Bockius LLP (57) ABSTRACT

A chassis platform module for an electric vehicle may include: a main frame having a battery mounted thereon; and a front wheel-side support frame unit connected to a front of the main frame. The front wheel-side support frame unit may include: a pair of first support frames disposed in a width direction of a vehicle, and each having a first connection groove formed at a front end thereof; a pair of second support frames disposed at a front of the pair of first support frames, respectively, and each having a second connection groove formed at a rear end thereof; a connection frame having connection protrusions inserted into the first and second connection grooves, respectively; an adhesive part adhered to the inner circumferential surfaces of the first and second connection grooves; and a fastening member coupled to each of the connection protrusions through each of the first and second support frames.

8 Claims, 7 Drawing Sheets

(51) Int. Cl.
    *B62D 25/20*    (2006.01)
    *B62D 27/02*    (2006.01)

(56) References Cited

U.S. PATENT DOCUMENTS

| | | | | |
|---|---|---|---|---|
| 4,881,756 | A * | 11/1989 | Kumasaka | B62D 65/04 |
| | | | | 296/193.03 |
| 5,320,403 | A * | 6/1994 | Kazyak | B62D 23/005 |
| | | | | 296/205 |
| 6,276,477 | B1 * | 8/2001 | Ida | B62D 21/10 |
| | | | | 296/193.04 |
| 7,766,388 | B1 * | 8/2010 | Marino | B62D 65/00 |
| | | | | 280/781 |
| 8,231,166 | B2 * | 7/2012 | Mori | B62D 21/152 |
| | | | | 296/203.02 |
| 2010/0171340 | A1 * | 7/2010 | Yasuhara | B62D 25/2018 |
| | | | | 296/205 |
| 2013/0206496 | A1 * | 8/2013 | Hashimoto | B62D 21/12 |
| | | | | 180/291 |
| 2018/0050606 | A1 * | 2/2018 | Sugitate | B60K 11/06 |
| 2018/0162448 | A1 * | 6/2018 | Takahashi | B62D 21/15 |
| 2019/0002022 | A1 | 1/2019 | Kim | |
| 2020/0010111 | A1 | 1/2020 | Tsubaki et al. | |

* cited by examiner

CHASSIS PLATFORM MODULE FOR ELECTRIC VEHICLE

CROSS-REFERENCE TO RELATED APPLICATION

This application claims the benefit under 35 U.S.C. § 119(a) of Korean Patent Application No. 10-2020-0083304 filed on Jul. 7, 2020 in the Korean Intellectual Property Office, the entire disclosure of which is incorporated herein by reference for all purposes.

BACKGROUND

Field

Exemplary embodiments of the present disclosure relate to a chassis platform module for an electric vehicle, and more particularly, to a chassis platform module for an electric vehicle, which can increase the structural stiffness of a frame for an electric vehicle.

Discussion of the Background

In general, an electric vehicle refers to a vehicle which operates by using electricity as power, and acquires driving energy by rotating a motor using electricity stored in a battery.

The chassis frame of such an electric vehicle is divided into a monocoque-type chassis frame and a frame-type chassis frame according to a manufacturing method, and the frame-type chassis frame forms one structure through a connection structure between an aluminum extruded material and a cast material and a connection structure between the extruded materials.

However, when a force is repeatedly applied to the assembled portion between the extruded material and the cast material and the assembled portion between the extruded materials in the conventional chassis frame, the coupling forces therebetween may be reduced. Therefore, there is a need for a technology capable of increasing the assembly strength between the extruded material and the cast material, the assembly strength between the extruded materials, and the durability of the extruded material and the cast material.

The related art of the present disclosure is disclosed in Korean Patent Application Publication No. 10-2020-0009685 published on Jan. 30, 2020 and entitled "Chassis Platform Module for Electric Vehicle".

SUMMARY

Various embodiments are directed to a chassis platform module for an electric vehicle, which can increase the coupling force of a frame for an electric vehicle.

Also, various embodiments are directed to a chassis platform module for an electric vehicle, which can increase durability by reinforcing a connection portion between frames.

In an embodiment, a chassis platform module for an electric vehicle may include: a main frame having a battery mounted thereon; and a front wheel-side support frame unit connected to the front of the main frame. The front wheel-side support frame unit may include: a pair of first support frames disposed in a width direction of a vehicle, extending in a front-to-rear direction of the vehicle, and each having a first connection groove formed at a front end thereof; a pair of second support frames disposed at the front of the pair of first support frames, respectively, so as to be spaced apart from the pair of first support frames, respectively, extending in the front-to-rear direction, and each having a second connection groove formed at a rear end thereof; a connection frame disposed between the respective first support frame and the respective second support frame, and having connection protrusions formed at front and rear ends thereof and inserted into the first and second connection grooves, respectively; an adhesive part applied onto an outer circumferential surface of each of the connection protrusions, and adhered to the inner circumferential surfaces of the first and second connection grooves; and a fastening member coupled to each of the connection protrusions through each of the first and second support frames.

Each of the connection protrusions may further include an application groove formed on the outer circumferential surface thereof, and the adhesive part may be applied into the application groove so as to have a shape corresponding to the application groove.

Each of the connection protrusions may further include a first locking stepped part formed on the outer circumferential surface thereof, and the first locking stepped part may have a stepped-up shape formed on the application groove and extend toward the connection frame, such that one end of the adhesive part is locked to the first locking stepped part.

Each of the connection protrusions may further include a fastening surface part formed on the outer circumferential surface thereof. The fastening member may be coupled to the fastening surface part, and the fastening surface part may extend toward the connection frame from the first locking stepped part.

Each of the connection protrusions may further include a second locking stepped part formed on the outer circumferential surface thereof, and the second locking stepped part may have a stepped-up shape formed on the fastening surface part and extend toward the connection frame, such that a front end of the first support frame and a rear end of the second support frame are locked to the second locking stepped part.

The fastening surface part may have a first fastening hole to which the fastening member is coupled, and each of the first and second support frames may have a second fastening hole which is formed thereof and located on the same line as the first fastening hole, such that the fastening member is coupled through the second fastening hole.

The chassis platform module may further include: a first reinforcement rib extending in a front-to-rear direction inside the first connection groove, and having both ends coupled to an inner circumferential surface of the first connection groove; and a second reinforcement rib extending in the front-to-rear direction inside the second connection groove, and having both ends coupled to an inner circumferential surface of the second connection groove.

A front end of the first reinforcement rib may be spaced apart from a front end of the first support frame, and a rear end of the second reinforcement rib may be spaced apart from a rear end of the second support frame.

In an embodiment, a chassis platform module for an electric vehicle may include: a pair of side frames disposed on both sides of a battery in a width direction of a vehicle, respectively; a pair of inclined frames connected to front ends of the side frames, respectively, such that a distance between the pair of inclined frames decreases in a direction away from the pair of inclined frames; a pair of support frames connected to front ends of the inclined frames, respectively, and extending in a front-to-rear direction; a reinforcement part having an inner surface contacting an outer inclined surface of each of the pair of inclined frames and a respective one of the pair of support frames; an adhesive part applied onto the inner surface of the reinforcement part, and adhered to the outer inclined surface and the respective one of the pair of support frames so as to contact both of the outer inclined surface and the respective one of the pair of support frames; and a fastening member coupled to the outer inclined surface and the respective one of the pair of support frames through the reinforcement part.

The reinforcement part may further include an application groove formed on the inner surface thereof, and the adhesive part may be applied into the application groove so as to have a shape corresponding to the application groove.

The reinforcement part may further include a locking stepped part formed on the inner surface thereof, and both sides of the adhesive part may be locked to the locking stepped parts on both sides of the application groove, respectively.

The reinforcement part may further include: a first support bar having an inner surface contacting the outer inclined surface and the respective one of the pair of support frames, and having the application groove formed on the inner surface of the first support bar; a second support bar located at an outer portion of the first support bar, and having both ends coupled to both ends of the first support bar, respectively; and a reinforcement rib disposed between the first and second support bars, and having both ends coupled to the first and second support bars, respectively.

The outer inclined surface and the respective one of the pair of support frames may each have a first fastening hole formed therein such that the fastening member is coupled to the first fastening hole, and the first support bar may have a second fastening hole formed in either side thereof and located on the same line as the first fastening hole, such that the fastening member is coupled to the second fastening hole through the first fastening hole.

The first support bar may further include contact surface parts formed on both sides thereof, respectively, and the contact surface parts may each have the second fastening hole formed therein, and be in contact with the outer inclined surface and the respective one of the pair of support frames, respectively.

The chassis platform module may further include: a front frame disposed at a front of the battery, and configured to connect the pair of side frames to each other; and a rear frame disposed at a rear of the battery, and configured to connect the pair of side frames to each other.

In accordance with the present embodiments, the adhesive structure may be added to the surface contact area between the frames, which are connected to each other, thereby increasing the coupling force between the frames. Furthermore, the adhesive structure may reinforce the connection portion between the frames, thereby preventing damage to the connection portion between the frames by a repeatedly transferred force.

DETAILED DESCRIPTION OF THE ILLUSTRATED EMBODIMENTS

Hereafter, exemplary embodiments of the present disclosure will be described in detail with reference to the accompanying drawings.

The advantages and characteristics of the present disclosure and a method for achieving the advantages and characteristics will be clearly described through the embodiments described in detail below with reference to the accompanying drawings.

However, the present disclosure are not limited by the embodiments disclosed below, and may be embodied in various different forms. These embodiments are provided to make this disclosure thorough and complete and to fully convey the scope of the present disclosure to those skilled in the art to which the present disclosure pertains. The present disclosure is only defined by the scope of claims.

Moreover, in describing the present disclosure, detailed descriptions related to publicly-known technology will be ruled out in order not to unnecessarily obscure subject matters of the present disclosure.

Figure 1:
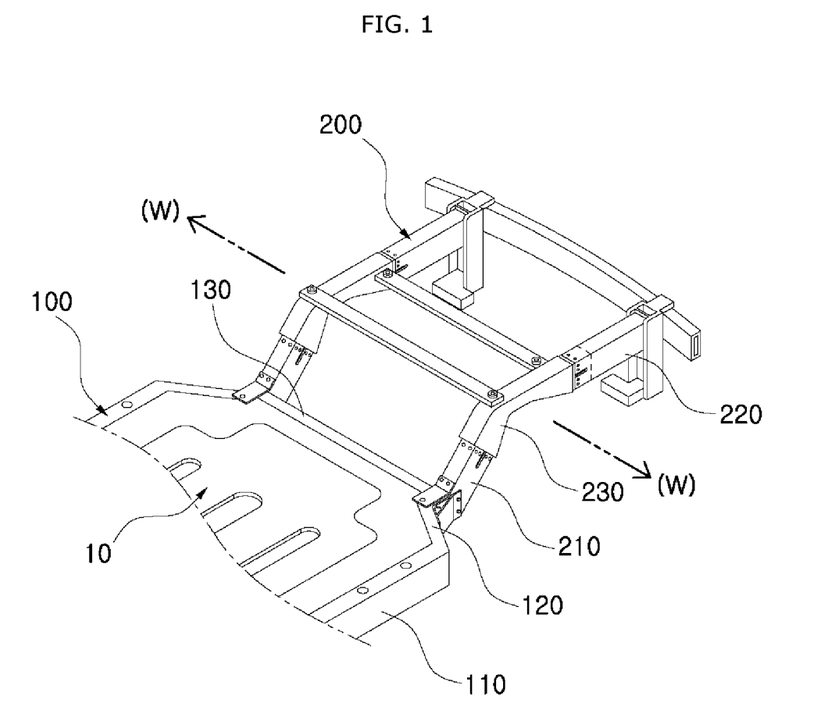
FIG. 1 is a perspective view illustrating that a chassis platform module for an electric vehicle in accordance with an embodiment of the present disclosure is applied to a vehicle frame.
Figure 2:
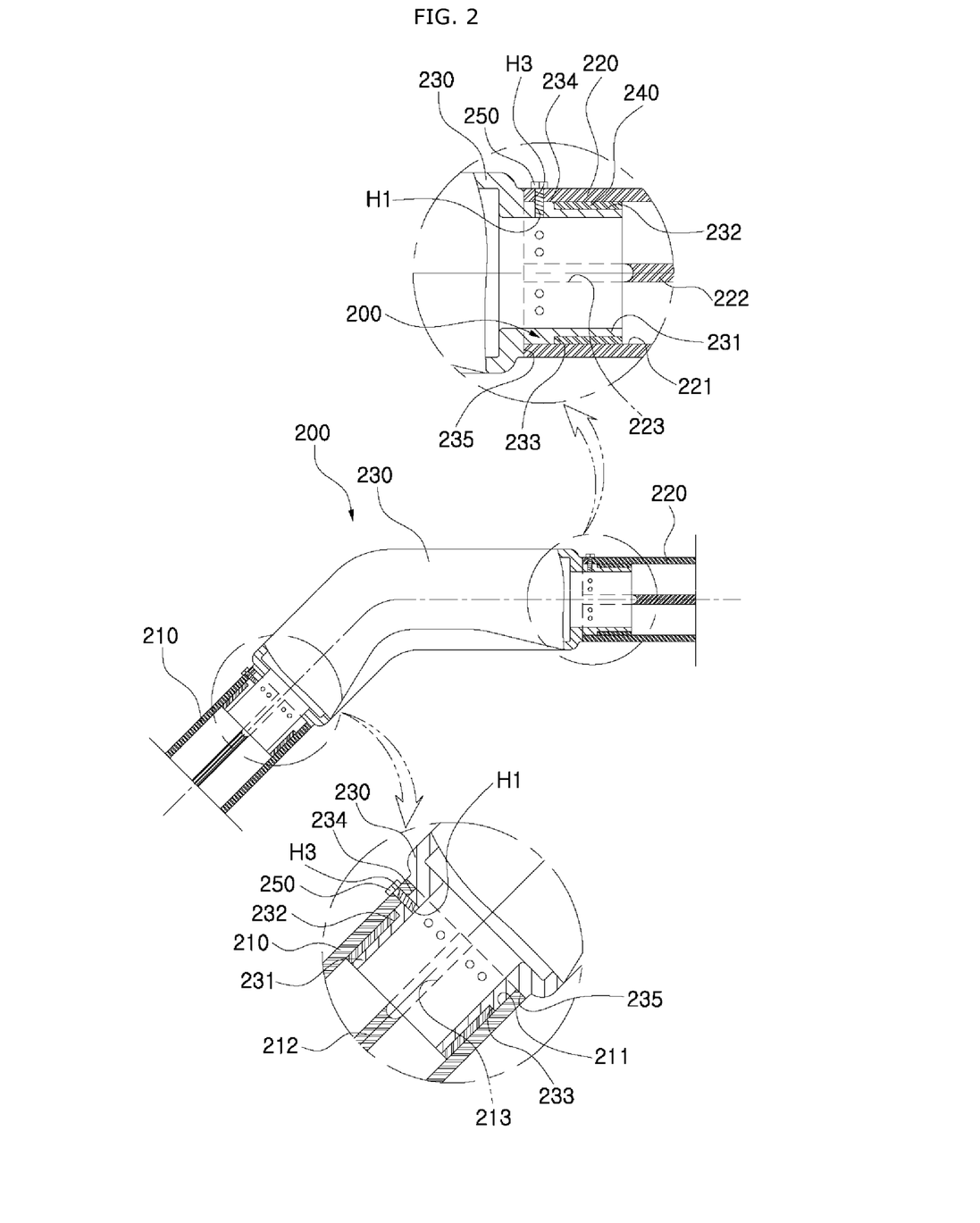
FIG. 2 is a disassembled perspective view illustrating that a first coupling part and a second coupling part are separated from each other in the chassis platform module for an electric vehicle in accordance with the embodiment of the present disclosure.
Figure 3:
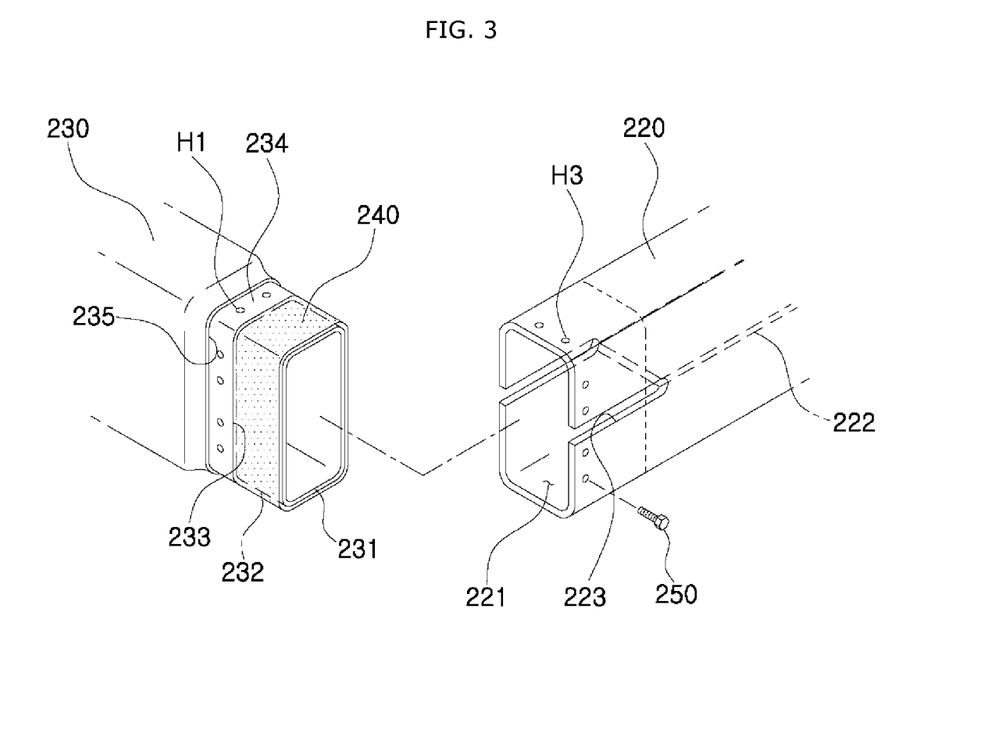
FIG. 3 is a side cross-sectional view illustrating that the first and second coupling parts are coupled to each other in the chassis platform module for an electric vehicle in accordance with the embodiment of the present disclosure.

FIG. 1 is a perspective view illustrating that a chassis platform module for an electric vehicle in accordance with an embodiment of the present disclosure is applied to a vehicle frame, FIG. 2 is a disassembled perspective view illustrating that a first coupling part and a second coupling part are separated from each other in the chassis platform module for an electric vehicle in accordance with the embodiment of the present disclosure, and FIG. 3 is a side cross-sectional view illustrating that the first and second coupling parts are coupled to each other in the chassis platform module for an electric vehicle in accordance with the embodiment of the present disclosure.

Figure 4:
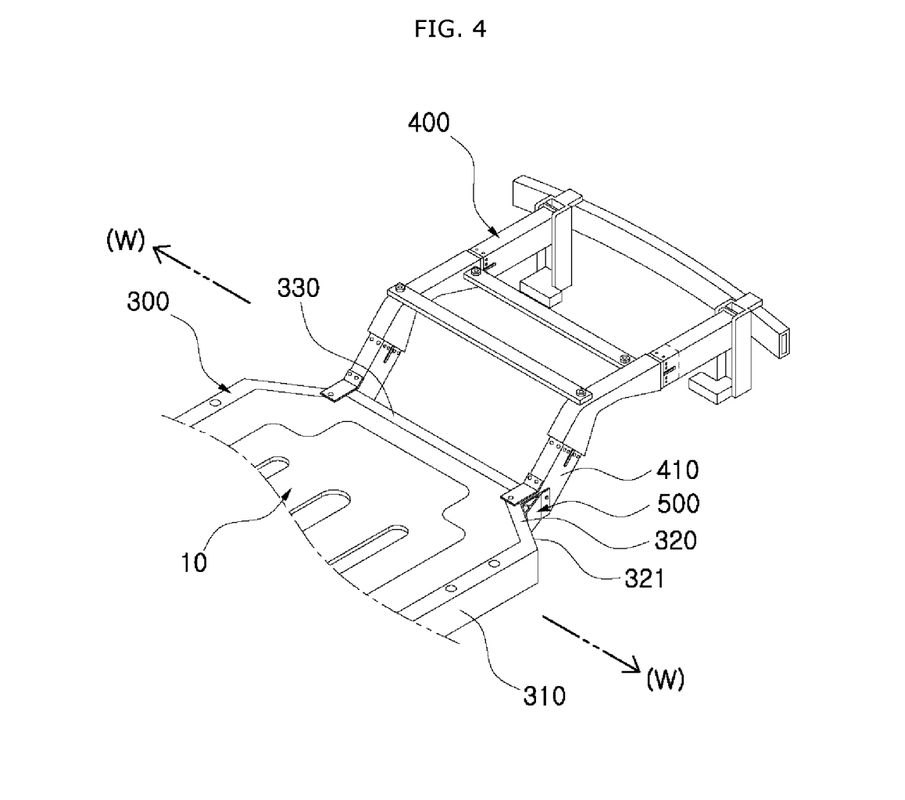
FIG. 4 is a perspective view illustrating that a chassis platform module for an electric vehicle in accordance with another embodiment of the present disclosure is applied to a vehicle frame.
Figure 5:
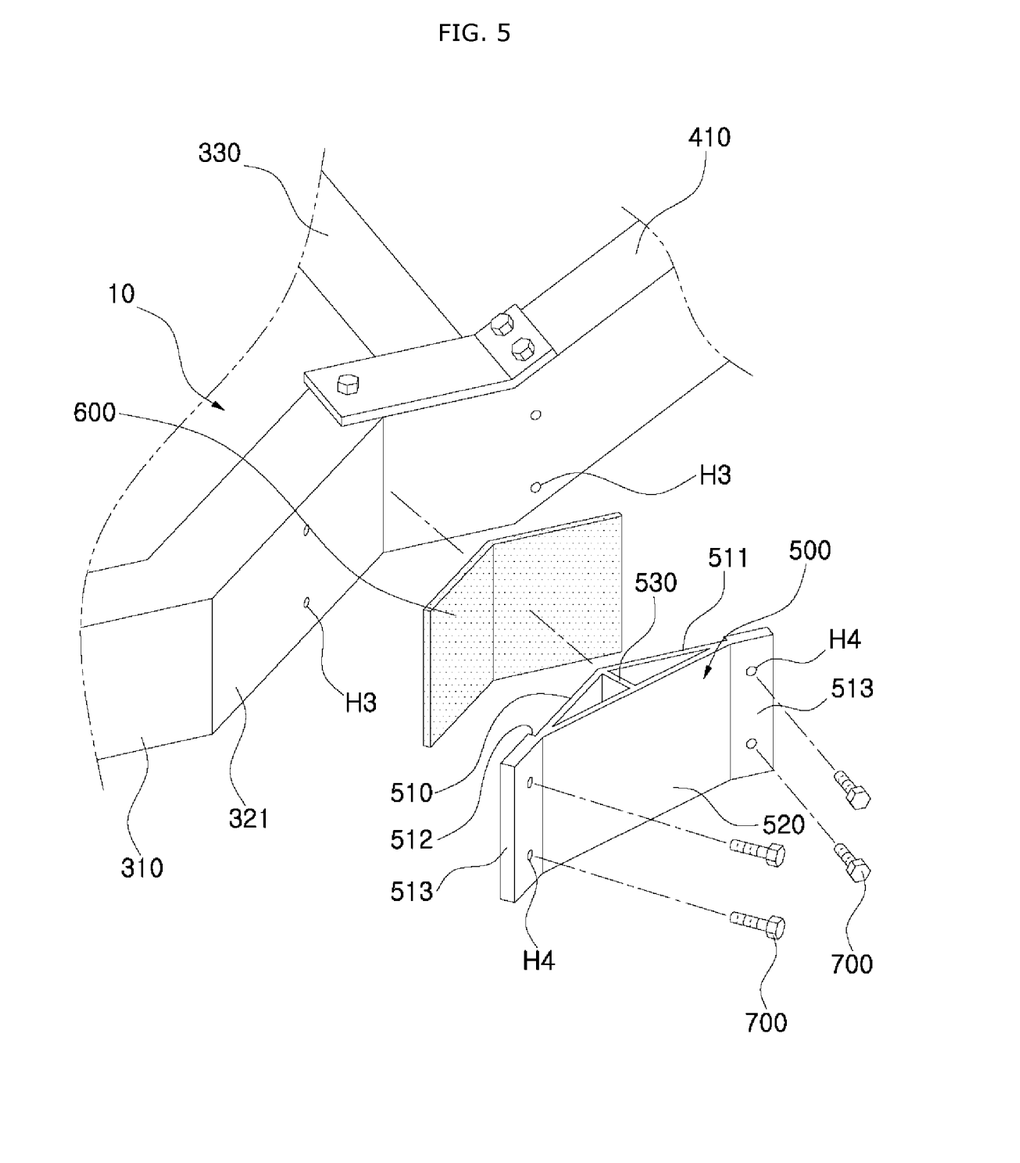
FIG. 5 is a disassembled perspective view illustrating the chassis platform module for an electric vehicle in accordance with the another embodiment of the present disclosure.
Figure 6:
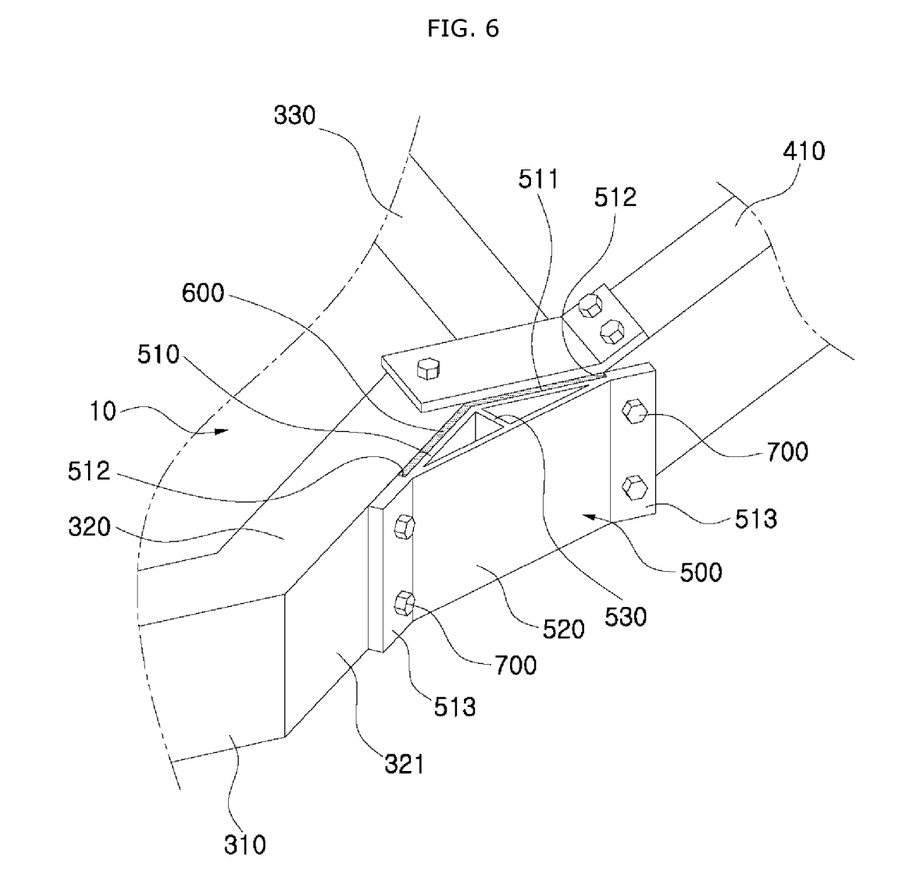
FIG. 6 is an assembled perspective view illustrating the chassis platform module for an electric vehicle in accordance with the another embodiment of the present disclosure.
Figure 7:
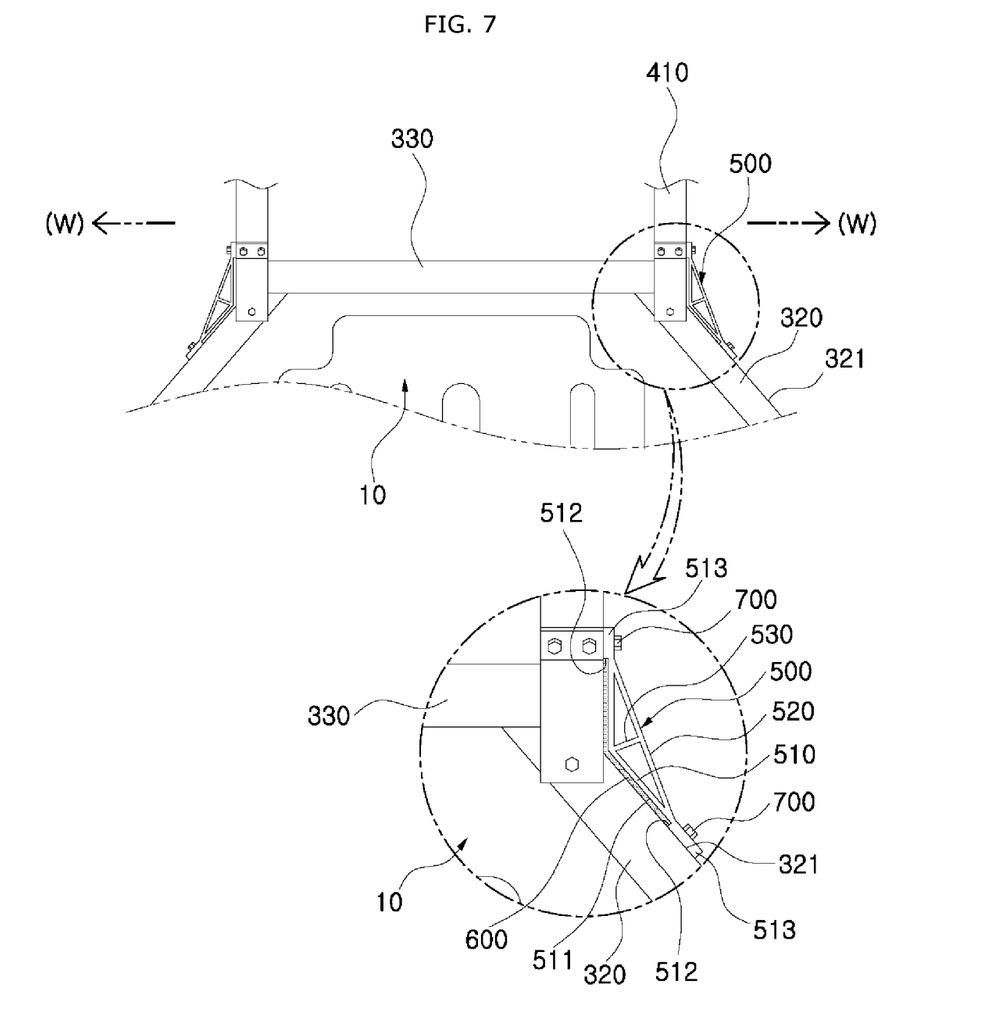
FIG. 7 is a plan view illustrating the chassis platform module for an electric vehicle in accordance with the another embodiment of the present disclosure.

FIG. 4 is a perspective view illustrating that a chassis platform module for an electric vehicle in accordance with another embodiment of the present disclosure is applied to a vehicle frame, and FIG. 5 is a disassembled perspective view illustrating the chassis platform module for an electric vehicle in accordance with the another embodiment of the present disclosure. FIG. 6 is an assembled perspective view illustrating the chassis platform module for an electric vehicle in accordance with the another embodiment of the present disclosure, and FIG. 7 is a plan view illustrating the chassis platform module for an electric vehicle in accordance with the another embodiment of the present disclosure.

Referring to FIGS. 1 to 3, the chassis platform module for an electric vehicle in accordance with the embodiment of the present disclosure includes a main frame 100 and a front wheel-side support frame unit 200. The main frame 100 has a battery 10 mounted thereon, and the front wheel-side support frame unit 200 is connected to the front of the main frame 100 and located on a front wheel side of the vehicle.

The main frame 100 includes a pair of side frames 110 and a pair of inclined frames 120, and the front wheel-side support frame unit 200 includes a pair of support frames 210. Furthermore, the main frame 100 may further include a front frame 130 and a rear frame (not illustrated), and a rear wheel-side support frame unit (not illustrated) located on a rear wheel side of the vehicle may be connected to the rear of the main frame 100.

The side frames 110 are disposed on both sides of the battery 10 in a vehicle width direction W, respectively, and each extend in a front-to-rear direction. Here, an extruded material (aluminum or the like) manufactured through an extrusion method may be used as the side frame 110.

The front frame 130 may be disposed at the front of the battery 10, and have both ends which connect the front ends of the inclined frames 120 or the side frames 110, respectively. The rear frame (not illustrated) may be disposed at the rear of the battery 10, and have both ends which connect the front ends of the side frames 110, respectively.

The pair of side frames 110 may be disposed in parallel to each other, and the front frame 130 and the rear frame may be disposed in parallel to each other. Thus, the side frames 110, the front frame 130 and the rear frame may form a rectangular frame shape. However, the shape in which the side frame 110, the front frame 130 and the rear frame are connected may be modified in various manners, if necessary. Furthermore, an extruded material (aluminum or the like) manufactured through an extrusion method may be used as the front frame 130 and the rear frame, and both longitudinal ends of the front frame 130 and both longitudinal ends of the rear frame may be coupled to the side frames 110 through separate coupling parts, respectively.

The front wheel-side support frame unit 200 is located on the front wheel side of the vehicle, and includes a pair of first support frames 210, a pair of second support frames 220, a connection frame 230, an adhesive part 240 and a fastening member 250.

The pair of first support frames 210 are disposed in the vehicle width direction W, each extend in the front-to-rear direction, and are disposed in parallel to each other while facing each other in the vehicle width direction W. Here, an extruded material (aluminum or the like) manufactured through an extrusion method may be used as the first support frame 210.

Furthermore, the first support frame 210 may have a first connection groove 211 formed at the front end thereof, the first connection groove 211 may extend in the front-to-rear direction of the first support frame 210, and a first reinforcement rib 212 is provided in the first connection groove 211. The first reinforcement rib 212 extends in the front-to-rear direction of the first support frame 210, both ends of the first reinforcement rib 212 are coupled to the inner circumferential surface of the first connection groove 211, and the front end of the first reinforcement rib 212 is spaced apart from the front end of the first support frame 210 to the rear.

The first connection groove 211 may have cut portions 213 formed on both sides thereof, the cut portions 213 being open to the front. The cut portion 213 may be formed when the front end of the first reinforcement rib 212 is removed as much as the length by which a connection protrusion 231 to be described below is inserted into the first connection groove 211.

The second support frame 220 is disposed at the front of the first support frame 210 so as to be spaced apart from the first support frame 210, extends in the front-to-rear direction and has a second connection groove 221 formed at the rear thereof. Here, an extruded material (aluminum or the like) manufactured through an extrusion method may be used as the second support frame 220.

The second connection groove 221 may extend in the front-to-rear direction of the second support frame 220, and a second reinforcement rib 222 may be provided in the second connection groove 221. The second reinforcement rib 222 extends in the front-to-rear direction, both ends of the second reinforcement rib 222 are coupled to the inner circumferential surface of the second connection groove 221, and the front end of the second reinforcement rib 222 is spaced apart from the rear end of the second support frame 220 to the front.

The second connection groove 221 may have cut portions 223 formed on both sides thereof, the cut portions 223 being open to the rear. The cut portion 223 may be formed when the front end of the second reinforcement rib 222 is removed as much as the length by which the connection protrusion 231 to be described below is inserted into the second connection groove 221.

The connection frame 230 is disposed between the first and second support frames 210 and 220, and has the connection protrusions 231 protruding from the front and rear ends thereof, respectively. The connection frame 230 may be made of a cast material manufactured through a casting method.

The connection protrusions 231 are inserted into the first connection groove 211 formed at the front end of the first support frame 210 and the second connection groove 221 formed at the rear end of the second support frame 220, respectively. The connection protrusion 231 may further have an application groove 232 formed on the outer circumferential surface thereof, and the adhesive part 240 which will be described below is applied into the application groove 232 so as to have a shape corresponding to the application groove 232. The connection frame 230 may extend in the front-to-rear direction, and the application groove 232 may be continuously formed along the circumference of the connection protrusion 231.

The connection protrusion 231 may have a first locking stepped part 233 formed on the outer circumferential surface thereof, and the first locking stepped part 233 may have a stepped-up shape formed on the application groove 232 and extend toward the connection frame 230 such that one end of the adhesive part 240 to be described below is locked to the first locking stepped part 233, and continuously formed along the circumference of the connection protrusion 231. The first locking stepped part 233 has a function of supporting the adhesive part 240 applied into the application groove 232, such that the adhesive part 240 is not pushed and moved to the rear.

The connection protrusion 231 has a fastening surface part 234 formed on the outer circumferential surface thereof, the fastening surface part 234 is formed at a different level from the application groove 232 so as to form the first locking stepped part 233 at the front thereof, and the fastening member 250 which will be described below is coupled to the fastening surface part 234. The fastening surface part 234 extends toward the connection frame 230 based on the first locking stepped part 233, and continuously formed along the circumference of the connection protrusion 231.

The fastening surface part 234 has one or more first fastening holes H1 to which the fastening member 250 to be described below is coupled, and the first and second support frames 210 and 220 each have a second fastening hole H3 formed thereon and located on the same line as the first fastening hole H1, such that the fastening member 250 is coupled through the second fastening hole H3. The plurality of first fastening holes H1 may be arranged along the circumference of the fastening surface part 234, and the plurality of second fastening holes H3 may be arranged along the circumferences of the first and second support frames 210 and 220.

Furthermore, the connection protrusion 231 may have a second locking stepped part 235 formed on the outer circumferential surface thereof, and the second locking stepped part 235 may have a stepped-up shape formed on the fastening surface part 234 and extend toward the connection frame 230, and continuously formed along the circumference of the connection protrusion 231. The front end of the first support frame 210 and the rear end of the second support frame 220 are locked to the second locking stepped part 235.

For example, when the connection protrusion 231 is coupled to each of the first and second connection grooves 211 and 221 through a male-female structure, the front end of the connection protrusion 231 is locked to the second locking stepped part 235. Thus, as the position of the connection protrusion 231 is limited by the second locking stepped part 235, the connection protrusion 231 may be correctly located at the assembly position.

The adhesive part 240 is applied onto the outer circumferential surface of the connection protrusion 231, and adhered to the inner circumferential surfaces of the first connection groove 211 formed at the front end of the first support frame 210 and the second connection groove 221 formed at the rear end of the second support frame 220. As the adhesive part 240, a structural adhesive for adhering metals to each other may be used.

The fastening member 250 is coupled to the connection protrusion 231 through each of the first and second support frames 210 and 220. Specifically, the fastening member 250 is coupled to the second fastening hole H3 of the connection protrusion 231 through the first fastening hole H1 of each of the first and second support frames 210 and 220. At this time, a screw part formed at one end of the fastening member 250 may be screwed to the second fastening hole H3, and a head part formed at the other end thereof may be locked to the outer surface of each of the first and second support frames 210 and 220.

That is, in the chassis platform module for an electric vehicle in accordance with the embodiment of the present disclosure, the position of the adhesive part 240 is not changed by the coupling force of the fastening member 250, and the connection portion between the connection frame 230 and each of the first and second support frames 210 and 220 is coupled by the adhesive force of the adhesive part 240. Therefore, the coupling force between the first and second support frames 210 and 220 and the connection frame 230 may be increased.

As illustrated in FIGS. 4 to 7, a chassis platform module for an electric vehicle in accordance with another embodiment of the present disclosure includes a main frame 300, a front wheel-side support frame unit 400, a reinforcement part 500, an adhesive part 600 and a fastening member 700. The main frame 300 has a battery 10 mounted thereon, and the front wheel-side support frame unit 400 is located on a front wheel side of the vehicle.

The main frame 300 includes a pair of side frames 310 and a pair of inclined frames 320, and the front wheel-side support frame unit 400 includes a pair of support frames 410. Furthermore, the main frame 300 may further include a front frame 330 and a rear frame 340, and a rear wheel-side support frame unit (not illustrated) located on a rear wheel side of the vehicle may be connected to the rear of the main frame 300.

The side frames 310 may be disposed on both sides of the battery 10 in the vehicle width direction W, respectively, extend in the front-to-rear direction of the vehicle, and be disposed in parallel to each other. Here, an extruded material (aluminum or the like) manufactured through an extrusion method may be used as the side frame 310.

The inclined frames 320 are connected to the front ends of the side frames 310, respectively, and inclined in directions facing each other such that the distance therebetween gradually decreases in a direction away from the pair of inclined frames. Here, an extruded material (aluminum or the like) manufactured through an extrusion method may be used as the inclined frame 320.

The front frame 330 may be disposed at the front of the battery 10, and have both longitudinal ends which face the vehicle width direction W and connect the front ends of the inclined frames 320 or the side frames 310, respectively. The rear frame (not illustrated) may be disposed at the rear of the battery 10, and have both longitudinal ends which face the vehicle width direction W and connect the front ends of the side frames 310, respectively.

The side frames 310 may be disposed in parallel to each other, and the front frame 330 and the rear frame may be disposed in parallel to each other. Thus, the side frames 310, the front frame 330 and the rear frame may form a lattice-type frame shape. However, the shape in which the side frames 310, the front frame 330 and the rear frame are connected may be modified in various manners, if necessary. Furthermore, an extruded material (aluminum or the like) manufactured through an extrusion method may be used as the front frame 330 and the rear frame, and both longitudinal ends of the front frame 330 and both longitudinal ends of the rear frame may be coupled to the side frames 310 through separate coupling parts, respectively.

The support frames 410 are disposed at the front of the main frame 300, each extend in the front-to-rear direction, and are disposed in parallel to each other. Here, an extruded material (aluminum or the like) manufactured through an extrusion method may be used as the support frame 410. The rear ends of the support frames 410 are connected to the front ends of the inclined frames 320, respectively, and the support frames 410 and outer inclined surfaces 321 of the inclined frames 320 are connected at different angles.

The reinforcement part 500 has an inner surface contacted with the outer inclined surface 321 of the inclined frame 320 and the support frame 410. Here, an extruded material (aluminum or the like) manufactured through an extrusion method may be used as the reinforcement part 500.

The reinforcement part 500 has an application groove 511 formed at the inner surface thereof, and the adhesive part 600 which will be described below is applied into the application groove 511 of the reinforcement part 500 so as to have a shape corresponding to the application groove 511. The inner surface of the reinforcement part 500 is contacted with the outer inclined surface 321 of the inclined frame 320 and the support frame 410 so as to have a shape corresponding to the outer inclined surface 321 of the inclined frame 320 and the support frame 410.

More specifically, the reinforcement part 500 may further include a first support bar 510 having an inner surface contacted with the outer inclined surface 321 and the support frame 410 and having the application groove 511 formed at the inner surface thereof, a second support bar 520 located at the rear of the first support bar 510 and having both ends coupled to both ends of the first support bar 510, respectively, and a reinforcement rib 530 disposed between the first and second support bars 510 and 520 and having both ends coupled to the first and second support bars 510 and 520, respectively.

The first support bar 510 is contacted with the outer inclined surface 321 and the support frame 410 so as to have a shape corresponding to the outer inclined surface 321 and the support frame 410, and bent and coupled to the outer inclined surface 321 in the connection direction of the support frame 410. At this time, the bent portion of the first support bar 510 may protrude forward. Furthermore, the bent portion of the first support bar 510 may be contacted as a male-female structure between the outer inclined surface 321 and the rear end of the support frame 410.

The first support bar 510 has a locking stepped part 512 formed at the inner surface thereof, and the locking stepped part 512 is disposed on either side of the application groove 511 such that the corresponding side of the adhesive part 600 to be described below is locked to the locking stepped part 512. That is, the locking stepped part 512 has a function of supporting the adhesive part 600 applied into the application groove 511 such that the adhesive part 600 is not pushed and moved to the side.

Furthermore, the first support bar 510 has contact surface parts 513 formed on both sides thereof, and the contact surface part 513 has one or more second fastening holes H4 formed therein. The first support bar 510 may extend in the direction that the inclined frame 320 and the support frame 410 are connected to each other, and both longitudinal ends of the first support bar 510 may have a predetermined inclination angle based on a bending line perpendicular to the longitudinal direction. The contact surface part 513 may be formed on either side of the first support bar 510 in the longitudinal direction thereof.

The contact surface parts 513 are contacted with the outer inclined surface 321 of the inclined frame 320 and the support frame 410, respectively. At this time, the second fastening hole H4 formed through the contact surface part 513 and a first fastening hole H3 formed through the outer inclined surface 321 or the support frame 410 are located on the same line.

The adhesive part 600 is applied onto the inner surface of the reinforcement part 500, and adhered to the outer inclined surface 321 and the support frame 410 so as to correspond to both of the outer inclined surface 321 and the support frame 410. As the adhesive part 600, a structural adhesive for adhering metals to each other may be used. The adhesive part 600 is applied in a shape corresponding to the application groove 511 of the first support bar 510, and has both sides supported by the locking stepped parts 512.

The fastening members 700 are coupled to the outer inclined surface 321 and the support frame 410 through the rear of the reinforcement part 500, respectively. Specifically, the fastening members 710 may be screwed to the first fastening holes H3 formed in the outer inclined surface 321 and the support frame 410 through the second fastening holes H4 formed in the contact surface parts 513, respectively. At this time, a screw part formed at one end of the fastening member 700 may be screwed to the first fastening hole H3, and a head part formed at the other end of the fastening member 700 may be locked to the outer surface of the contact surface part 513.

The second support bar 520 may extend in the direction that the inclined frame 320 and the support frame 410 are connected to each other, and spaced apart from the rear of the first support bar 510 in the width direction of the second support bar 520, and both longitudinal ends of the second support bar 520 are coupled to both longitudinal ends of the first support bar 510, respectively. At this time, the second support bar 520 may have a straight line shape in the longitudinal direction thereof.

The reinforcement rib 530 has one end connected to the rear surface of the first support bar 510 and the other end connected to the front surface of the second support bar 520, and supports the first and second support bars 510 and 520 in the front-to-rear direction. Here, a plurality of reinforcement ribs 530 may be arranged in the longitudinal direction of the first and second support bars 510 and 520 so as to be spaced apart from each other. That is, since the first and second support bars 510 and 520 are supported by the supporting force of the reinforcement rib 530, the first and second support bars 510 and 520 may be prevented from being deformed by an external force.

Such a reinforcement part 500 may be manufactured through an extrusion method so as to have a predetermined length, such that the first and second support bars 510 and 520 and the reinforcement rib 530 can be formed together. The reinforcement part 500 can be cut in a direction perpendicular to the extrusion direction and thus manufactured to have various widths.

The adhesive part 600 is applied in a shape corresponding to the application groove 511 of the first support bar 510, and has one side adhered to the outer inclined surface 321 of the inclined frame 320 and the opposite side adhered to the support frame 410. As the adhesive part 600, a structural adhesive for adhering metals to each other may be used.

The fastening members 700 are screwed to the first fastening holes H3 formed in the outer inclined surface 321 and the support frame 410, respectively, through the second fastening holes H4 of the contact surface part 513. At this time, the screw part formed at one end of the fastening member 700 may be screwed to the first fastening hole H3, and the head part formed at the other end of the fastening member 700 may be locked to the rear surface of the contact surface part 513.

When the reinforcement part 500 is coupled, the one-side contact surface part 513 is contacted with the outer inclined surface 321 of the inclined frame 320, the other-side contact surface part 513 is contacted with the support frame 410 so as to correspond to the width direction thereof, and the adhesive part 600 applied into the application groove 511 is adhered to the outer inclined surface of the inclined frame 320 and the support frame 410.

At this time, each of the first fastening holes H3 formed in the outer inclined surface 321 and the support frame 410, respectively, and the second fastening hole H4 formed in the contact surface part 513 are located on the same line. Then, when the fastening member 700 is coupled to the first fastening hole H3 through the second fastening hole H4, the first support bar 510 is closely fixed to the outer inclined surface 321 of the inclined frame 320 and the support frame 410.

That is, in the chassis platform module for an electric vehicle in accordance with the another embodiment of the present disclosure, the position of the adhesive part 600 is not changed by the coupling force of the fastening member 700, and the connection portion between the inclined frame 320 and the support frame 410 is reinforced by the adhesive force of the adhesive part 600, which makes it possible to increase the durability of the connection portion between the inclined frame 320 and the support frame 410.

As described above, the adhesive structure may be added to the surface contact area between the first support frame 210 and the connection frame 230, which are connected to each other, and the surface contact area between the second support frame 220 and the connection frame 230, which are connected to each other. Thus, the coupling force between the first and second support frames 210 and 220 and the connection frame may be increased, and the connection portion between the inclined frame 320 and the support frame 410 may be reinforced, which makes it possible to prevent damage to the connection portion of the frame by forces which are repeatedly transferred.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A chassis platform module for an electric vehicle, comprising:
   a main frame having a battery mounted thereon; and
   a front wheel-side support frame unit connected to a front of the main frame,
   wherein the front wheel-side support frame unit comprises:
   a pair of first support frames disposed in a width direction of the vehicle, extending in a front-to-rear direction of the vehicle, and each having a first connection groove formed at a front end thereof;
   a pair of second support frames disposed at the front end of the pair of first support frames, respectively, so as to be spaced apart from the pair of first support frames, respectively, extending in the front-to-rear direction, and each having a second connection groove formed at a rear end thereof;
   a connection frame disposed between the respective first support frame and the respective second support frame, and having connection protrusions formed at front and rear ends thereof and inserted into the first and second connection grooves, respectively;
   an adhesive part applied onto an outer circumferential surface of each of the connection protrusions, and adhered to inner circumferential surfaces of the first and second connection grooves; and
   a fastening member coupled to each of the connection protrusions through each of the first and second support frames.

2. The chassis platform module of claim 1, wherein each of the connection protrusions further comprises an application groove formed on the outer circumferential surface thereof,
   wherein the adhesive part is applied into the application groove so as to have a shape corresponding to the application groove.

3. The chassis platform module of claim 2, wherein each of the connection protrusions further comprises a first locking stepped part formed on the outer circumferential surface thereof,
   wherein the first locking stepped part has a stepped-up shape formed on the application groove and extends toward the connection frame, such that one end of the adhesive part is locked to the first locking stepped part.

4. The chassis platform module of claim 3, wherein each of the connection protrusions further comprises a fastening surface part formed on the outer circumferential surface thereof,
   wherein the fastening member is coupled to the fastening surface part, and the fastening surface part extends toward the connection frame from the first locking stepped part.

5. The chassis platform module of claim 4, wherein each of the connection protrusions further comprises a second locking stepped part formed on the outer circumferential surface thereof,
   wherein the second locking stepped part has a stepped-up shape formed on the fastening surface part and extends toward the connection frame, such that a front end of the first support frame and a rear end of the second support frame are locked to the second locking stepped part.

6. The chassis platform module of claim 4, wherein the fastening surface part has a first fastening hole to which the fastening member is coupled,
   wherein each of the first and second support frames has a second fastening hole which is formed thereon and located on the same line as the first fastening hole, such that the fastening member is coupled through the second fastening hole.

7. The chassis platform module of claim 1, further comprising:
   a first reinforcement rib extending in a front-to-rear direction inside the first connection groove, and having both ends coupled to an inner circumferential surface of the first connection groove; and
   a second reinforcement rib extending in the front-to-rear direction inside the second connection groove, and having both ends coupled to an inner circumferential surface of the second connection groove.

8. The chassis platform module of claim 7, wherein a front end of the first reinforcement rib is spaced apart from a front end of the first support frame, and
   a rear end of the second reinforcement rib is spaced apart from a rear end of the second support frame.

* * * * *